Feb. 22, 1966  E. G. PERRY, JR., ETAL  3,236,177
SIMPLIFIED PRINTING RECORDER
Filed June 13, 1961  5 Sheets-Sheet 1
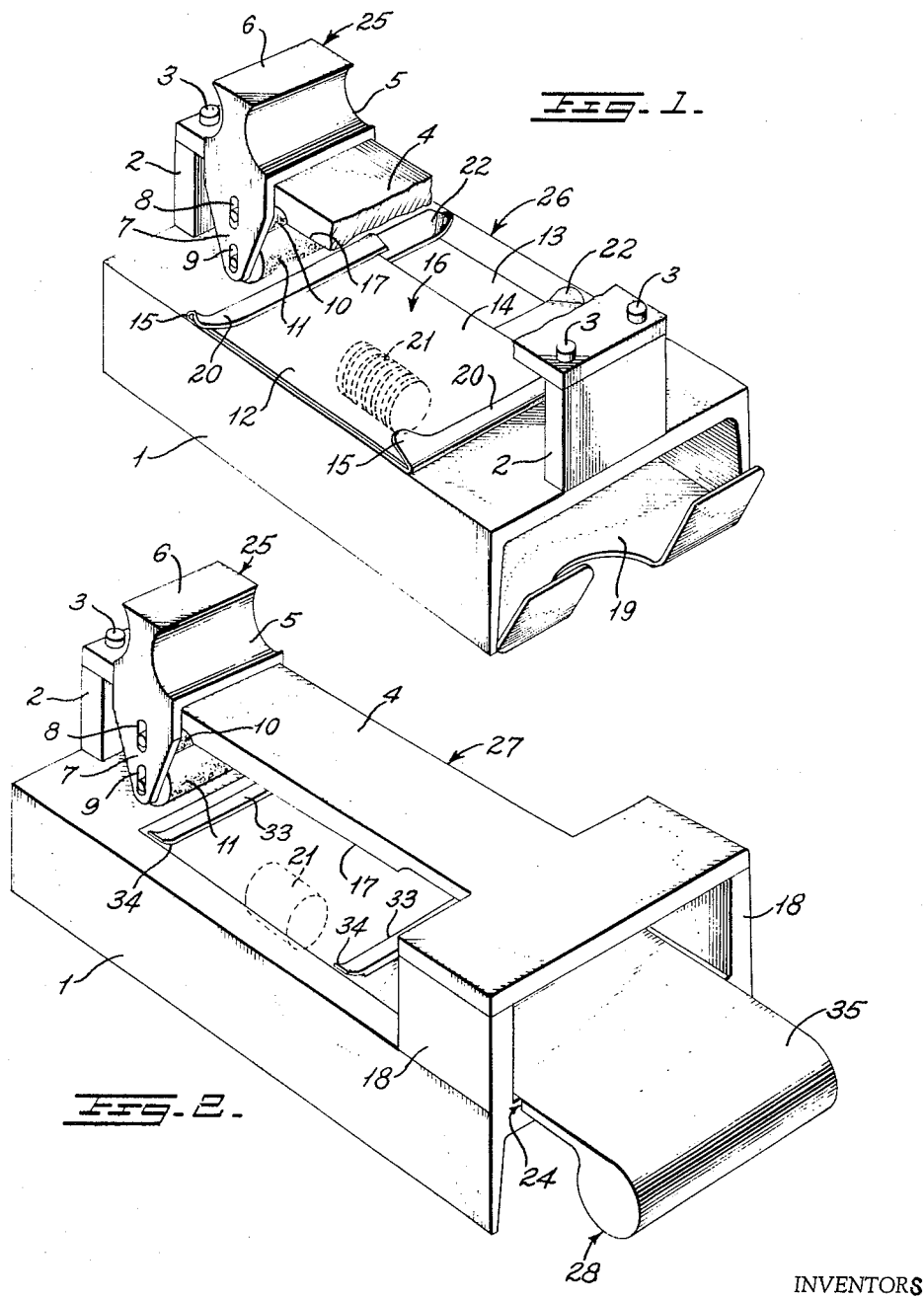
INVENTORS
Edward Gordon Perry, Jr.,
Kenneth A. Cook
BY
*Stevens, Davis, Miller & Mosher*
ATTORNEYS Feb. 22, 1966
E. G. PERRY, JR., ETAL
3,236,177
SIMPLIFIED PRINTING RECORDER
Filed June 13, 1961
5 Sheets-Sheet 2
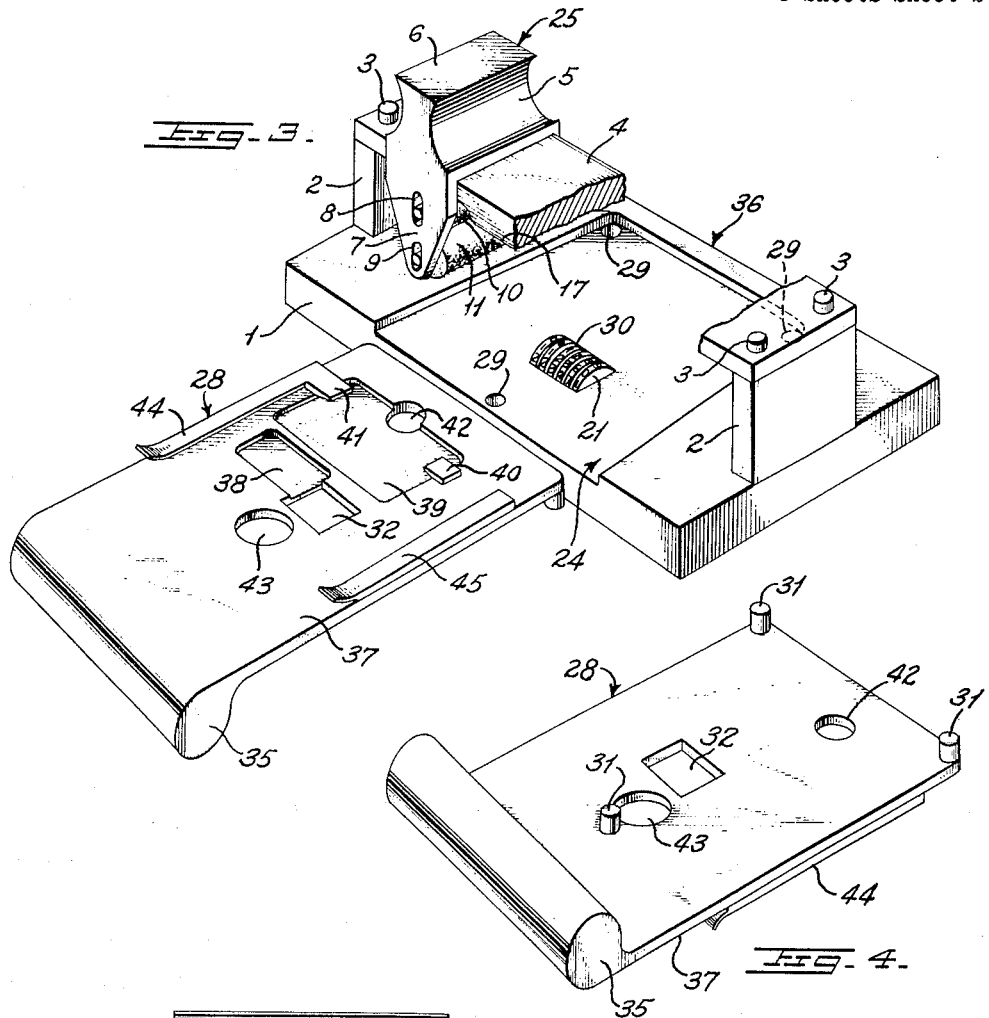
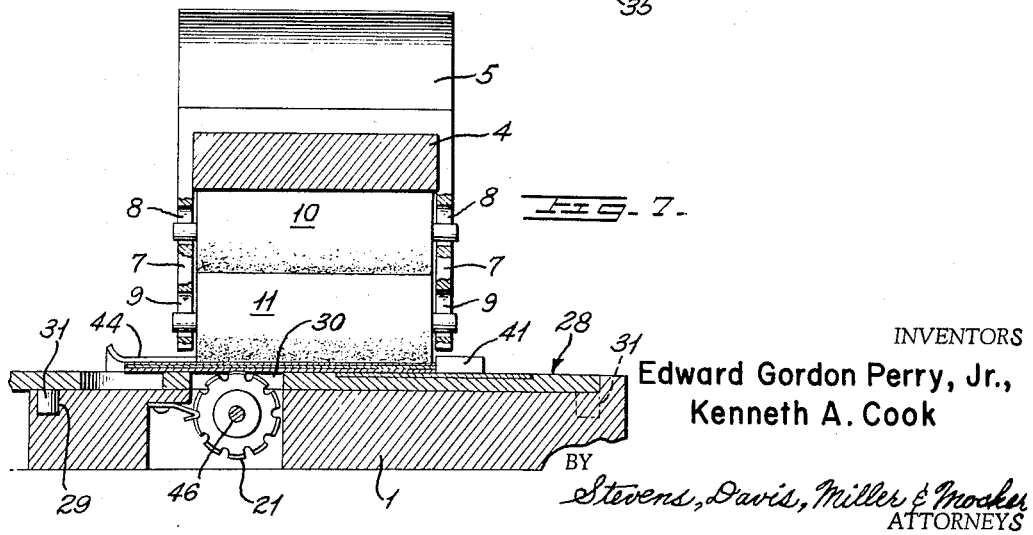
INVENTORS
Edward Gordon Perry, Jr.,
Kenneth A. Cook
BY
Stevens, Davis, Miller & Mosher
ATTORNEYS

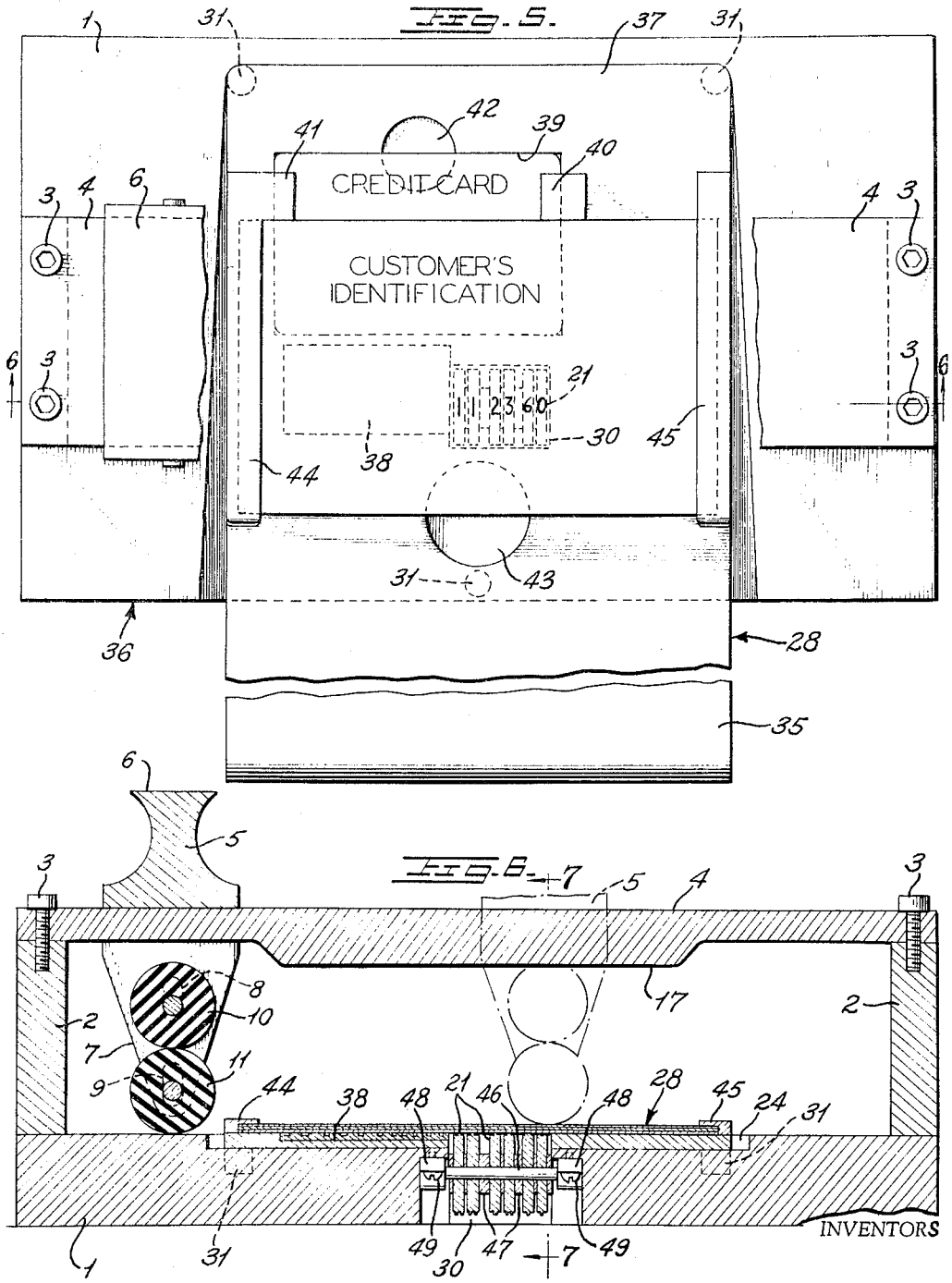

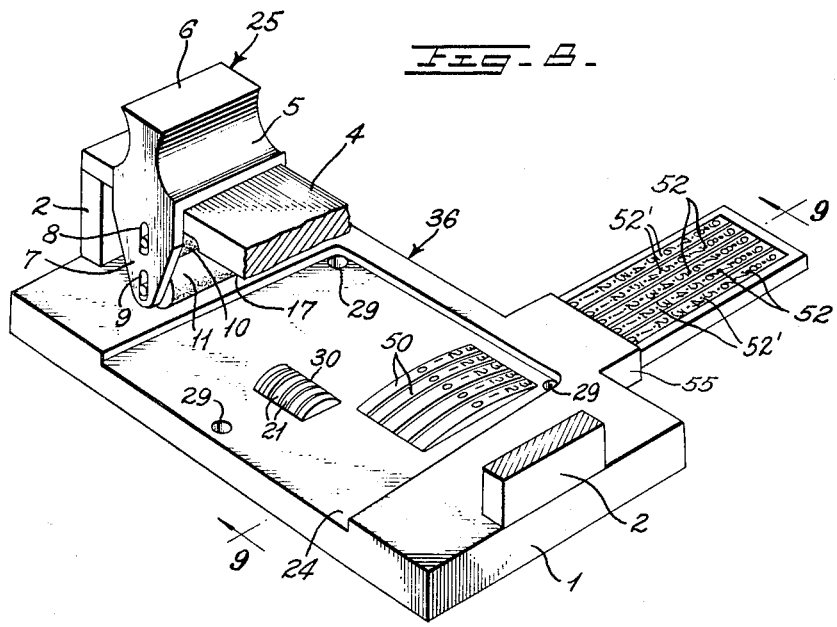
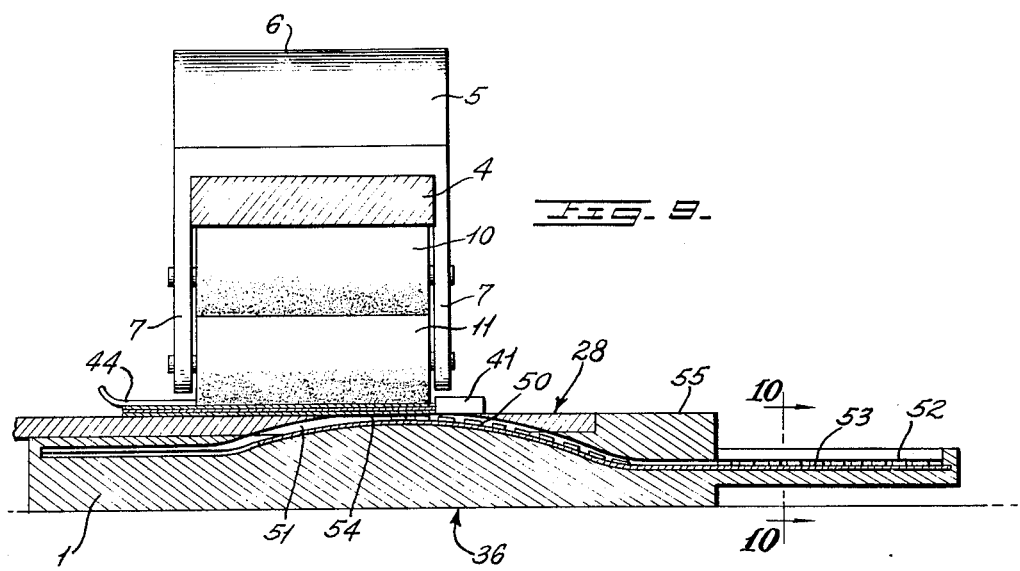
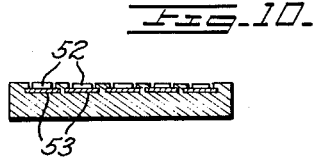

Feb. 22, 1966 E. G. PERRY, JR., ETAL 3,236,177
SIMPLIFIED PRINTING RECORDER
Filed June 13, 1961 5 Sheets-Sheet 5
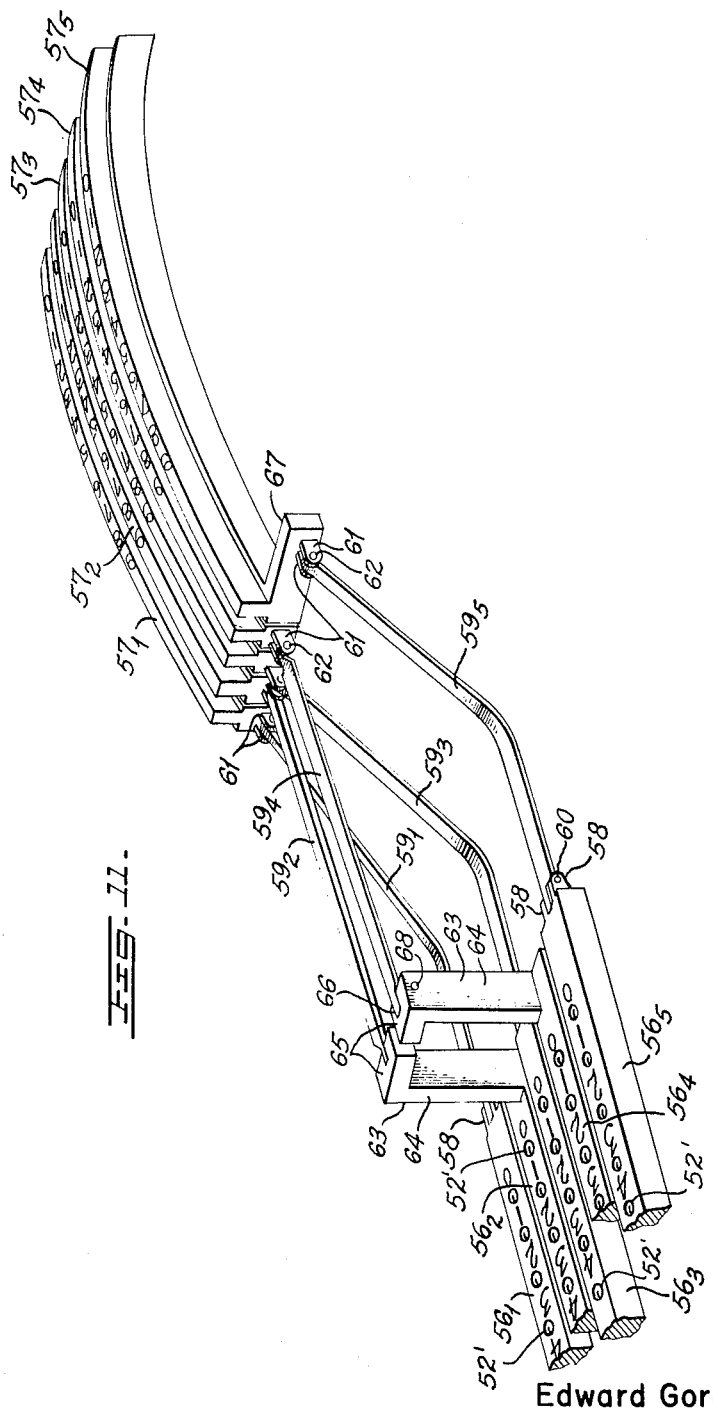
INVENTORS
Edward Gordon Perry, Jr.,
Kenneth A. Cook
BY
*Stevens, Davis, Miller & Mosher*
ATTORNEYS

United States Patent Office 3,236,177
Patented Feb. 22, 1966

1

**3,236,177
SIMPLIFIED PRINTING RECORDER**
Edward Gordon Perry, Jr., and Kenneth A. Cook, Dallas, Tex., assignors to Sperry Rand Corporation, a corporation of Delaware
Filed June 13, 1961, Ser. No. 116,736
2 Claims. (Cl. 101—269)

The present invention relates to printing recorders for printing information on cards or invoices, and more particularly to a printing recorder for recording and invoicing credit sales transactions at gasoline service stations or other sales establishments where a credit card system may be employed using customer credit cards.

It is the usual practice with recording devices presently in use for recording sales at gasoline stations and other establishments where a credit card is used for the salesman to first imprint a blank invoice form with the information on the customer's credit card by means of an imprinter of the type used for embossed credit token in department stores generally being employed. The imprinted invoice is then secured to a clip board or other device capable of holding the invoice so that the salesman can write in the various items making up the total sale, the date, and the name of the dealer. The invoice and clip board are then given to the customer for his signature.

The present invention, in some of its embodiments, significantly reduces handling in such transactions by eliminating the clip board or other invoice holder and substituting therefor a printing field board which is specifically designed to have a dealer's identification card secured thereto and which is provided with a depression for receiving the customer's credit card. The invoice form is then positioned on the printing field board over the dealer's and customer's cards and the salesman then records the sales items on the invoice form in spaces provided therefor. The printing field board is specifically designed to cooperate with unique printing recorders which can be positioned near the gas pumps and which comprise a base which contains depressions in its surface, for properly positioning the printing field board.

After the operator writes each sale on the invoice form, which is interleaved with carbon paper, the printing recorder is set to print the total amount of the sale and the printing field board with the invoice form and dealer's and customer's cards thereon is then properly positioned on the surface of the base of the recorder by means of a depression in said surface and posts on said printing field board. After the board is properly positioned on the recorder a roller assembly is advanced over the invoice to exert a sufficient rolling pressure thereon to print the various embossed characters on the dealer's identification and the customer's credit card on the invoice form as well as the total amount of the sale and the date, by the action of the carbon paper interleaving the invoice form pages. The printer itself may have integral dating rollers, and print bars set to indicate the amount of sale which are positioned to lie beneath the printing field board when the board is properly positioned on the recorder base and project upwardly through suitable openings provided in the printing field board to position the appropriate embossed characters and numerals thereon in contact with predetermined portions of the invoice form. In this manner the information will be printed on the invoice form when the roller assembly passes over it. After the roller assembly has completely passed over the invoice form, the printing

2 field board is simply withdrawn from the printing recorder with all of the information accurately printed thereon in one quick operation.

It is one object of this invention to provide a simple printing recorder which greatly speeds up the recording of sales transactions.

It is another object of this invention to provide a separate printing recorder and printing field board which cooperate with each other to print desired information in the desired positions on an invoice.

It is a still further object of this invention to provide a printing recorder which can be used with a plurality of printing field boards wherein each of the printing field boards is specifically designed to handle various sizes and thicknesses of customer's credit cards.

It is a still further object of this invention to provide a recorder which will print desired information on an invoice form accurately and clearly so that the invoices can thereafter by "read" by machines.

Further objects and advantages of the present invention will become readily apparent from the following detailed description of several embodiments of the invention when taken in conjunction with the drawings, wherein:

FIGURE 1 is an isometric view of one embodiment of a printing recorder wherein the invoice is manually inserted into the recorder;

FIGURE 2 is an isometric view of a second embodiment of a printing recorder wherein the printing field board is inserted lengthwise of the base of the recorder;

FIGURE 3 is an isometric view of a third embodiment of a printing recorder wtih a printing field board about to be placed on the surface of said recorder;

FIGURE 4 is an isometric view of the under side of the printing field board illustrated in FIGURE 3;

FIGURE 5 is a top view of the embodiment of FIGURE 3 with the printing field board in printing position;

FIGURE 6 is a sectional view of the embodiment of FIGURE 5 taken along the line 6—6;

FIGURE 7 is a sectional view of the embodiment of FIGURE 6 taken along the line 7—7;

FIGURE 8 is an isometric view of a fourth embodiment of a printing recorder;

FIGURE 9 is a sectional view of the embodiment of FIGURE 8 taken along the line 9—9;

FIGURE 10 is a sectional view of the embodiment of FIGURE 9 taken along the line 10—10; and FIGURE 11 is a second embodiment of the curved print bars.

Referring to FIGURE 1, a printing recorder 26 embodying features of the present invention is illustrated which comprises a channel shaped base 1 having blocks 2 secured on the upper surface thereof. A traveler bar 4 including a cam surface 17 on its underside (shown more clearly in FIGURE 2) is supported on the upper surface of blocks 2 and secured thereto by cap screws 3 (shown more clearly in FIGURE 6). A roller platen carrier 25 is slidably mounted on traveler bar 4. Roller platen carrier 25 comprises a sliding frame 5 which includes a handle portion 6 and two side plates 7, one on each side of the sliding frame 5. Side plates 7 each contain two ovoid holes 8 and 9 having their major axes in the vertical plane. Rollers 10 and 11 have their axles mounted within said holes 8 and 9, said rollers being loosely mounted in said holes due to the greater length of the vertical axes of said holes. A frame 16 is also secured to the upper surface of said base 1. Said frame includes flanges 20 for proper positioning of an invoice thereunder and retaining ears 22 for proper positioning of a credit card thereunder. The inner edges of flanges 20 are spaced slightly above the inner edges of retaining ears 22 to permit an invoice form to overlap a credit card which has been placed beneath retaining ears 22. Frame 16 further includes a depression 13 to hold the credit card, the depth of said depression being equal to the thickness of the credit card so that the raised portions of the credit card project above the surface 12 of the frame.

The base 1 is further provided with a set of dating rollers 21 (shown more clearly in FIGURES 6 and 7) which lie within the base, the uppermost character on each dating roller projecting above the surface 12 of frame 16 through a rectangular opening in said base and frame. The dating rollers 21 comprise a number of individual wheels, each wheel containing the raised numbers 0 to 9 spaced about its periphery. The wheels are equal in width and diameter and are coaxially aligned along axle 46. A spacer 47 is placed between each set of two wheels to separate the designations of month, day and year by the width of the spacer. The ends of the axle 46 are mounted in brackets 48, the brackets being fastened to the base 1 by means of screws 49 extending through the brackets. Each wheel can be manually turned about on its axis independently of the other wheels. Therefore, six wheels, each of which has been properly set, will serve to indicate the date, as for example, 07 04 76. A holding device (not shown) may be provided to more securely hold each wheel of said dating rollers 21 fixed in position after the wheel has been positioned, as, for example, an abutting spring member.

A pocket 19 for holding invoice forms is provided in the under portion of said base 1.

The embodiment of FIGURE 1 is operated by first adjusting the dating rollers 21 to show the proper date. Roller platen 25 is positioned contiguous to one of the blocks 2. A customer's credit card is then positioned beneath retaining ears 22 and an invoice is positioned beneath flanges 20 in the area 14 with the aid of guides 15 so that the invoice partially overlaps the credit card, lying above the embossed characters on said credit card.

Roller platen carrier 25 is then moved manually along the full length of traveler bar 4. The lower roller 11 will exert sufficient pressure on the invoice and the characters on the credit card and timing rollers to cause marks to be placed on the invoice indicative of the information on said timing rollers and credit card. This pressure is developed by the wedging effect produced on the dual rollers 10 and 11 when said rollers are positioned between the printing field and the cam surface 17. This is possible because the rollers are capable of having vertical motion due to the shape of holes 9 and 10 which loosely support the axles of said rollers. The traversal of the traveling bar 4 by the roller platen carrier 25 is stopped by the exposed heads of the cap screws 3.

It should be noted that with this recorder the printing operation can be carried on by moving the roller platen carrier 25 in either direction along the traveling bar.

The resulting invoice form will contain the date and the information required from the credit card in legible, machine readable form without the possibility of mistake.

Referring to FIGURE 2, a printing recorder 27 embodying features of the present invention is illustrated wherein like numbers represent the same elements set forth in the description of FIGURE 1. The printing recorder includes a channel shaped base 1 having blocks 2 and 18 secured on the upper surface thereof. A T-shaped traveler bar 4 including a cam surface 17 on its underside is supported on the upper surface of blocks 2 and 18 at the base of the T and at each end of the horizontal member of the T. The base portion of the T is secured to block 2 by cap screws 3 while the ends of the horizontal portion of the T are secured to blocks 18 by screws 23. A roller platen carrier 25 is slidably mounted on traveler bar 4. Roller platen carrier 25 comprises a sliding frame 5 which includes a handle portion 6 and two side plates 7, one on each side of the sliding frame 5. Side plates 7 each contain two ovoid holes 8 and 9 having their major axes in the vertical plane. Rollers 10 and 11 have their axles mounted within said holes 8 and 9, said rollers being loosely mounted in said holes due to the greater length of the vertical axes of said holes. Base 1 is provided with a depression 24 to receive a printing field board to be described more fully later. (FIGURE 3 illustrates the depression more clearly though it is noted that the depression of FIGURE 3 is designed to receive a printing field board from the front rather than from the side, as shown in FIGURE 2.) Within the depression 24 are three holes 29 (FIGURE 3) arranged at the apices of an equilateral triangle. The surface of the depressed area 24 is further provided with rectangular opening 30 (FIGURE 3) for positioning dating rollers 21. Dating rollers 21 described in connection with FIGURE 1, lie in the base region, the uppermost characters being sufficiently raised through opening 30 above the top surface of the depression to be in printing position. Printing field board 28 includes three posts 31 which are designed to fit into holes 29 to position said board (FIGURE 3). The printing field board includes a rectangular opening 32 which is positioned above opening 30 when the printing field board is properly positioned. Printing field board 28 also includes a pair of flanges 33 for proper positioning of an invoice thereunder and retaining ears (not shown) for proper positioning of a credit card.

The embodiment of FIGURE 2 is operated by first adjusting the dating rollers 21 to show the proper date. Roller platen 25 is positioned contiguous to block 2. A customer's credit card is then positioned beneath the retaining ears (not shown) and an invoice is positioned beneath flanges 33 with the aid of guides 34 so that the invoice partially overlaps the credit card lying above the embossed characters on said credit card. The printing field board 28 is then grasped by handle 35 and positioned in printing recorder 27 so that the posts 31 are positioned within the holes 29. The uppermost portions of the dating rollers will extend sufficiently above the surface of the printing field board 28 to be in printing position.

Roller platen carrier 25 is then moved manually along the full length of traveler bar 4. The lower roller 11 will exert sufficient pressure on the invoice and the characters on the credit card and timing rollers to cause marks to be placed on the invoice indicative of the information on said credit card and timing rollers. This pressure is developed by the wedging effect produced on the dual rollers 10 and 11 when said rollers are positioned between the printing field and the cam surface 17. This is possible because the rollers are capable of having vertical motion due to the shape of holes 9 and 10 which loosely support the axles of said rollers. The printing field board containing the invoice is then removed from the printing recorder. The invoice may now have further information added to it while still on the printing field board, thereby eliminating the necessity of removing the invoice and placing it upon a clip board before adding the additional information.

Referring to FIGURES 3 to 7, a printing recorder 36 embodying features of the present invention is illustrated wherein like numbers represent the same elements set forth in the description of FIGURES 1 and 2. The printing recorder includes a base 1 having blocks 2 secured on the upper surface thereof. A traveler bar 4 including a cam surface 17 on its underside is supported on the upper surfaces of blocks 2 by cap screw 3. A roller platen carrier 25 is slidably mounted on the traveler bar 4. Roller platen carrier 25 comprises a sliding frame 5 which includes a handle portion 6 and two side plates 7, one on each side of sliding frame 5. Side plates 7 each contain two holes 8 and 9 having their major axes in the vertical plane. Rollers 10 and 11 have their axles mounted within said holes 8 and 9, said rollers being loosely mounted in the said holes due to the greater length of the vertical axes of said holes. Base 1 is provided with a depression 24 to receive a printing field board 28. The depression may be tapered from front to rear. The depression contains three holes 29 and a rectangular opening 30. Dating rollers 21 described in connection with FIGURES 1 and 2, and described more fully later, lie in the base region, the uppermost character being sufficiently raised above the top surface of the depression to be in printing position in the printing field.

The printing field board 28 (FIGURES 3 and 4) comprises a substantially flat rectangular plate 37 which is preferably die cast from a light-weight alloy as a single piece. One end of the plate 37 is formed to provide a handle 35 to enable the user to conveniently grasp the plate during use. The upper flat surface of the plate 37 constitutes the printing field and the various letters, numbers or other characters which project above the upper surface will be considered as being in the printing field. The upper surface is provided with a suitable rectangular depression 38 for receiving a dealer's identification plate which may indicate, in the form of raised letters and numerals projecting into the printing field, the name and address of the dealer, vendor, or other user of the particular printing recorder 36. Since the dealer's identification plate forms a semi-permanent part of the printing recorder, it may be suitably secured in the depression 38 by adhesive material, or screws, or the like.

Another rectangular depression 39 is provided for receiving the customer's credit card and suitable retaining ears 40 and 41 are provided which overlap the depression 39 to hold the credit card in position. The depressions 38 and 39 have a depth approximately equal to the thickness of the dealer identification plate and customer credit card, respectively, so that the raised characters thereon project above the upper surface of the plate 37 into the printing field. A suitable hole 42 may be provided in the plate 37 through the depression 39 to facilitate removal of the customer's credit card and a similar hole 43 may be provided in plate 37 to facilitate the removal of an invoice form to be positioned over the depressions 38 and 39. Flanges 44 and 45 are secured to plate 37 with the inner edges thereof spaced slightly above the plate to enable the invoice form to be positioned beneath the flanges. The flanges 44 and 45 prevent the invoice from lifting and moving off the plate 37 and the ears 40 and 41 engage one edge of the invoice to position it on the plate.

A rectangular opening 32 is provided in the plate 37 to permit raised characters on dating rollers 21 carried within the printing recorder base 1 to project upwardly therethrough to print the date on the invoice. Plate 37 is also provided wth three posts 31 which project downwardly from the underside of the plate for positioning said plate in the printing recorder. The plate 37 is properly positioned when each of the posts 31 lies within one of the holes 29.

The embodiment of FIGURES 3 to 7 is operated by first setting the dating rollers 21 to show the proper date. Roller platen 25 is positioned contiguous to one of blocks 2. The dealer's identification plate is positioned within the depression 38. The customer's credit card is then positioned within the depression 39. An invoice (not shown) is then positioned beneath flanges 44 and 45, overlapping said card and plate, one edge of the invoice abutting ears 40 and 41 for proper positioning. The printing field board 28 is then grasped by handle 35 and positioned in the printing recorder 36. The proper positioning of board 28 is accomplished by partially setting the board into depression 24 and then pushing said board toward the rear portion of depression 24. The posts 31 keep the board sufficiently elevated to clear the projecting dating rollers 21 as the board slides over them. As the board is pushed toward the rear of the depression the posts 31 are guided toward the holes 29 due to the tapered sides of depression 24 until the posts 31 drop into their matching holes 29, indicating that the board 28 is now in printing position. The printing operation then takes place by the manual operation of the roller platen carrier 25 as described in connection with the operation of FIGURE 1.

FIGURES 8 to 10 set forth a further embodiment of the invention of FIGURES 3 to 7. This embodiment is designed to print the total amount of the sale on the invoice along with the information printed on the invoice by the embodiment of FIGURES 3 to 7.

FIGURE 8 sets forth, in addition to the structure of FIGURES 3 to 7, a device which will indicate the amount of the sale and will then print said amount on the invoice in addition to the information placed on the invoice by the embodiment of FIGURES 3 to 7. The device comprises a channel 51 positioned in the base 1 of recorder 36. A plurality of curved print bars 50 are slidably positioned in a channel 51, the curved print bars 50 being preferably of a relatively flexible strip material upon which the numerals have been embossed. The flexible strips 53 ride along channel 51, a portion of said channel being raised toward the top surface of base 1 to bring the uppermost one of the embossed numerals in each strip into the printing field.

A plurality of setting bars 52 are provided each setting bar having a plurality of numbered holes, grooves or depressions therein, one hole, groove or depression 52' associated with each numeral. The setting bars 52 are also slidably positioned in channel 51. The setting bars are secured to flexible strip 53 and, accordingly, any movement of the setting bars along the channel 51 will impart a similar movement to the curved print bars along the channel 51.

It should be noted that the printing field board 28 would be provided with a rectangular opening 54 through it similar to opening 32 to accommodate the curved print bars 50.

The printing recorder of FIGURES 8 to 10 will perform all of the operations set forth in connection with the recorder of FIGURES 3 to 7 and, in addition, it will print the amount of the sale on the invoice. To perform this step the operator places his finger in the hole 52' corresponding to the desired number on one setting bar 52 and moves the setting bar along in the channel 51 until the desired number on said setting bar is positioned closest to the base extension 55. This position is attained when the finger contacts the base extension 55. Since the extension 55 serves as a finger stop, no particular care is required in setting the bar after the finger has been inserted into the hole bearing the desired number. This operation is carried out for each setting bar. The number in the printing position on curved print bar 50 will correspond to the number in the depression on said setting bar 52 which is closest to said extension 55. In this manner the curved print bars 50 can be positioned to indicate the amount of the sale. The reading on the print bars 50 can be checked by noting the numbers in the depressions on said setting bars which are positioned closest to said extension.

When the amount of the sale is set on the recorder and the remaining steps indicated in connection with the embodiment of FIGURES 3 to 7 have been completed, printing can take place in the same manner as indicated in connection with the embodiment of FIGURE 1. The result will be an invoice containing pertinent information as to the dealer, the customer, the date and the amount of the sale, all printed on said invoice in one simple operation.

FIGURE 11 illustrates a second embodiment for indicating the amount of the sale on the invoice. It may be desirable to have a device for indicating the amount of the sale wherein the setting bars are wider than the print bars in order to more easily accommodate the operator's finger. This type of device cannot be satisfactorily operated within a channel 51 where the setting bars and the print are of the same width. The problem is overcome by the use of setting bars 56 which are wider than print bars 57. Each of the setting bars $56_1$, $56_3$ and $56_5$ are provided with two extensions 58 said extensions being separated from each other by a predetermined distance. One end of each of rods $59_1$, $59_3$ and $59_5$, respectively, is positioned between the extensions 58 of setting bars $56_1$, $56_3$ and $56_5$, respectively, said rods being secured to said extension by means of a pin 60 extending through extensions 58 and rods 59. Each of the print bars 57 is provided with a pair of extensions 61 at one end thereof separated by a predetermined distance. The other end of each of rods $59_1$ to $59_5$ is positioned between the extensions 61 of prints bars $57_1$ to $57_5$, respectively, each of said rods being secured to extensions 61 by means of a pin 62. Print bar $57_5$ is provided with an arm 67 onto which extensions 61 are secured. An L shape member 63 is secured to the end portion of setting bars $56_2$ and $56_4$, and positioned so that one arm 64 of said L member extends perpendicular to said setting bars, the other arm 65 of said L member extending normal to said arm 64 and lying in a plane parallel to the plane containing said setting bars 56. The L members are so positioned that they are mirror images of each other. Arms 65 include a notch 66 into which the other end of rods $59_2$ and $59_4$ are positioned and held in place by a pin 67 extending through arm 65 and the end portion of rods $59_2$ and $59_4$.

The embodiment of FIGURE 11 is operated by placing each of the setting bars in the position corresponding to the amount to be shown on the invoice. This is accomplished by placing the operator's finger into a depression 52' above the desired number on each setting bar 56 and pushing it to the proper position. The corresponding rod 59 will position the corresponding print bar 57 to place the chosen number in the printing position.

Each print bar 57 would be provided with a triangular notch (not shown) on the underside of the bar corresponding to each embossed numeral on the top of the bars. A spring urged detent blade (not shown) would reside in a row of notches across the bars, thereby aiding precise alignment of the print bars.

Though the invention has been described with respect to specific embodiments, many variations will be obvious to those skilled in the art, as, for example, an interchanging of specific features from one of the above disclosed embodiments with a second embodiment. Accordingly, it is the intention to be limited only as indicated by the scope of the following claims which are to be interpreted as broadly as possible in view of the prior art.

What is claimed is:

1. A printing recorder for printing information on an invoice form which includes, in combination, a base member having generally planar upper and lower surfaces with first and second openings in said upper surface, a printing field frame positioned in a recess in said upper surface of said base member, said printing field frame having a planar upper surface for carrying the invoice form and having first and second openings therein aligned respectively with said first and second openings in said base member, a first plurality of raised indicia carried by said base member at least one of which project upwardly through said first opening in said base member and through said first opening in said field frame above the upper surface of said printing field frame for engaging the underside of said invoice form, a channel in said base member having continuous bottom surface, said bottom surface having end portions located beneath the top of said base member and a generally centrally located upwardly curved extending portion which extends upwardly through said first opening in the top surface of said base member so as to communicate with said first opening in said field frame, at least one flexible strip having upper and lower surfaces and first and second end portions and which is slidably positioned for displacement within said channel and supported by said bottom surface of said channel, the at least one strip having a plurality of raised indicia on the upper surface thereof along the first end portion thereof, the upwardly extending portion of said bottom surface of said channel having a curvature and upward extent and said strip having a thickness so that one of the raised indicia on said strip projects above the upper surface of said printing field frame in a raised printing position for engaging the underside of said invoice form, and means for exerting a pressure over said invoice form whereby information from whatever of the first plurality of raised indicia and the plurality of raised indicia on the upper surface of the at least one flexible strip which project above the upper surface of said printing field frame may be printed on the invoice form.

2. A printing recorder for printing information on an invoice form which includes, in combination, a base member having generally planar upper and lower surfaces with first and second openings in said upper surface, a printing field frame positioned in a recess in said supper surface of said base member, said printing field frame having a planar upper surface for carrying the invoice form and having first and second openings therein aligned respectively with said first and second openings in said base member, a first plurality of raised indicia carried by said base member at least one of which project upwardly through said first opening in said base member and through said first opening in said field frame above the upper surface of said printing field frame for engaging the underside of said invoice form, a channel in said base member having continuous bottom surface, said bottom surface having end portions located beneath the top of said base member and a generally centrally located upwardly curved extending portion which extends upwardly through said first opening in the top surface of said base member so as to communicate with said first opening in said field frame, at least one flexible strip having upper and lower surfaces and first and second end portions and which is slidably positioned for displacement within said channel and supported by said bottom surface of said channel, the at least one strip having plurality of raised indicia on the upper surface thereof along the first end portion thereof, the upwardly extending portion of said bottom surface of said channel having a curvature and upward extent and said strip having a thickness so that one of the raised indicia on said strip projects above the upper surface of said printing field frame in a raised printing position for engaging the underside of said invoice form, indicating indicia on the second end portion of said flexible strip which indicates which of said raised indicia on the other end portion thereof is in said raised printing position, and means for exerting a pressure over said invoice form whereby information from whatever of the first plurality of raised indicia and the plurality of raised indicia on the upper surface of the at least one flexible strip which project above the upper surface of said printing field frame may be printed on the invoice form.

References Cited by the Examiner

UNITED STATES PATENTS

| 1,819,158 | 8/1931 | Gale | 101—426 |
|---|---|---|---|
| 2,116,235 | 5/1938 | Curtis | 101—407 X |
| 2,321,057 | 6/1943 | Weiss | 101—426 |

(Other references on following page)

UNITED STATES PATENTS

| | | | |
|---|---|---|---|
| 2,606,491 | 8/1952 | Wockenfuss | 101—109 |
| 2,606,494 | 8/1952 | Vogt | 101—269 |
| 2,647,461 | 8/1953 | Robinson | 101—109 |
| 2,694,975 | 11/1954 | Garver | 101—374 |
| 2,746,385 | 5/1956 | Muller | 101—109 |
| 2,909,998 | 10/1959 | Maul | 101—269 |
| 2,950,048 | 8/1960 | Luhn. | |
| 3,083,641 | 4/1963 | Childs et al. | 101—269 |

ROBERT E. PULFREY, *Primary Examiner.*

ROBERT A. LEIGHEY, WILLIAM B. PENN,
*Examiners.*